(12) United States Patent
Gergis

(10) Patent No.: US 10,618,409 B2
(45) Date of Patent: Apr. 14, 2020

(54) HYBRID-LITE SYSTEMS FOR VEHICLES

(71) Applicant: Mobile Climate Control, Corp., Goshen, IN (US)

(72) Inventor: Adel Gergis, York, PA (US)

(73) Assignee: Mobile Climate Control, Corp., Goshen, IN (US)

( * ) Notice: Subject to any disclaimer, the term of this patent is extended or adjusted under 35 U.S.C. 154(b) by 200 days.

(21) Appl. No.: 15/953,847

(22) Filed: Apr. 16, 2018

(65) Prior Publication Data
US 2018/0297472 A1    Oct. 18, 2018

Related U.S. Application Data

(60) Provisional application No. 62/485,438, filed on Apr. 14, 2017.

(51) Int. Cl.
| | |
|---|---|
| *B60K 25/00* | (2006.01) |
| *B60L 1/00* | (2006.01) |
| *B60L 1/02* | (2006.01) |
| *B60K 6/48* | (2007.10) |
| *B60W 20/15* | (2016.01) |
| *B60W 30/18* | (2012.01) |
| *B60K 11/02* | (2006.01) |
| *B60L 1/14* | (2006.01) |
| *B60L 50/15* | (2019.01) |
| *B60K 25/02* | (2006.01) |
| *B60W 20/10* | (2016.01) |
| *B60K 6/485* | (2007.10) |
| *B60W 10/08* | (2006.01) |
| *B60W 10/30* | (2006.01) |
| *B60W 20/00* | (2016.01) |

(52) U.S. Cl.
CPC .............. *B60L 1/003* (2013.01); *B60K 6/48* (2013.01); *B60K 6/485* (2013.01); *B60K 11/02* (2013.01); *B60K 25/00* (2013.01); *B60K 25/02* (2013.01); *B60L 1/02* (2013.01); *B60L 1/14* (2013.01); *B60L 50/15* (2019.02); *B60W 10/08* (2013.01); *B60W 10/30* (2013.01); *B60W 20/00* (2013.01); *B60W 20/10* (2013.01); *B60W 20/15* (2016.01); *B60W 30/18127* (2013.01); *B60W 30/18136* (2013.01); *B60K 2025/005* (2013.01); *B60K 2025/022* (2013.01); *B60L 2210/10* (2013.01); *B60W 2300/10* (2013.01); *B60W 2540/10* (2013.01); *B60W 2710/086* (2013.01); *B60Y 2306/07* (2013.01); *Y10S 903/903* (2013.01)

(58) Field of Classification Search
CPC ............................ B60K 25/00; B60W 2300/10
See application file for complete search history.

(56) References Cited

U.S. PATENT DOCUMENTS

| | | | |
|---|---|---|---|
| 4,489,242 A | 12/1984 | Worst | |
| 7,119,454 B1 | 10/2006 | Chiao | |
| 7,258,183 B2 * | 8/2007 | Leonardi | B60K 6/28 180/65.1 |

(Continued)

*Primary Examiner* — Sherry L Estremsky
(74) *Attorney, Agent, or Firm* — Barnes & Thornburg LLP

(57) ABSTRACT

A Hybrid-Lite system for use with a vehicle includes a prime mover, an electric power system, and auxiliaries. The prime mover comprises an internal combustion engine. The electric power system is configured to be driven by the combustion engine to produce electric energy for powering the auxiliaries.

20 Claims, 8 Drawing Sheets

(56) References Cited

U.S. PATENT DOCUMENTS

| | | | |
|---|---|---|---|
| 8,939,240 B2* | 1/2015 | Wehrwein | B60K 25/00 180/53.5 |
| 9,783,193 B2* | 10/2017 | Lasson | B60L 3/0084 |
| 10,300,870 B2* | 5/2019 | Da Silva Carvalho | B60L 8/003 |
| 2012/0207620 A1* | 8/2012 | Dalum | B60K 6/12 417/44.1 |
| 2018/0236994 A1* | 8/2018 | Healy | B60W 20/14 |

* cited by examiner

HYBRID-LITE SYSTEMS FOR VEHICLES

CROSS REFERENCE TO RELATED APPLICATIONS

This application claims priority to and the benefit of U.S. Provisional Patent Application No. 62/485,438, filed 14 Apr. 2017, the disclosure of which is now expressly incorporated herein by reference.

FIELD OF THE DISCLOSURE

The present disclosure relates generally to vehicles, and more specifically to electric power generation and management systems for use with vehicles.

BACKGROUND

Typical hybrid vehicles may include an internal combustion engine and an electric motor that cooperate to increase fuel efficiency of the vehicle. In some hybrid vehicles, the combustion engine is used to charge a battery or other energy storage device. The battery powers the electric motor which in turn drives the wheels of the vehicle. In other hybrid vehicles, the wheels are selectively driven by either or both of the combustion engine and the electric motor.

Unlike vehicles driven by conventional combustion engines, new hybrid vehicles are designed to include and accommodate components needed for the hybrid system. As such, many conventional vehicles remain in service, but do not benefit from the improved fuel efficiency that a hybrid system may provide. As a result, there remains a need to incorporate hybrid systems into conventional vehicles powered by internal combustion engines.

SUMMARY

The present disclosure may comprise one or more of the following features and combinations thereof.

A Hybrid-Lite system includes a combustion engine, a transmission coupled with the combustion engine and configured to be driven by the combustion engine, and an electric power system. In some embodiments, the electric power system includes a motor-generator configured to be driven by the combustion engine to produce electric energy having alternating current, a plurality of vehicle auxiliary systems, and an electric power distribution system having an active front end variable frequency drive and a plurality of channels.

In some embodiments, the active front end variable frequency drive is connected with the motor-generator. Each of the plurality of channels is connected with the active front end variable frequency drive. Each of the plurality of channels is connected with a corresponding one of the plurality of vehicle auxiliary systems so that the vehicle auxiliary systems are configured to be powered without being driven directly by the combustion engine.

In some embodiments, the plurality of vehicle auxiliary systems include at least an air conditioner compressor, an air compressor, a power steering pump, and a DC-to-DC converter. In some embodiments, the motor-generator is configured to generate about 15 kilowatts or greater of power.

In some embodiments, the motor-generator and the active front end variable frequency drive are not connected with a battery. In some embodiments, the motor-generator is configured to drive the transmission. In some embodiments, the transmission is configured to be driven only by the combustion engine.

In some embodiments, the DC-to-DC converter is configured to reduce a voltage of the electric energy received from the active front end variable frequency drive. The DC-to-DC converter is configured to direct the electric energy having reduced voltage to at least one of the plurality of vehicle auxiliary systems.

In some embodiments, the plurality of vehicle auxiliary systems further includes air conditioner air movers and a lighting system. The DC-to-DC converter may be connected with the air conditioner air movers and the lighting system. In some embodiments, the plurality of vehicle auxiliary systems further include an electric heater, a lighting system, air-conditioner air movers, and a starter motor configured to start the combustion engine.

In some embodiments, the electric power distribution system includes a battery connected with the active front end variable frequency drive, the motor-generator, and at least one of the vehicle auxiliary systems. In some embodiments, the motor-generator is configured to drive the transmission.

In some embodiments, the combustion engine includes a coolant fluid. The plurality of vehicle auxiliary systems further includes an electric heater configured to heat the coolant fluid.

In some embodiments, the Hybrid-Lite system further includes a liquid-to-air heat exchanger configured to extract heat from the coolant fluid to condition air moving through the liquid-to-air heat exchanger. In some embodiments, the electric heater is connected directly with the motor-generator.

According to another aspect of the present disclosure, a method includes a number of steps. The method may include providing a combustion engine, a transmission coupled with the combustion engine and configured to be driven by the combustion engine, and an electric power system including a motor-generator, a plurality of vehicle auxiliary systems, and an electric power distribution system connected with the motor-generator and the plurality of vehicle auxiliary systems, driving the motor-generator with the combustion engine to cause the motor-generator to produce electric energy having alternating current, directing the electric energy having alternating current from the motor-generator to the electric power distribution system, directing the electric energy having alternating current directly from the electric power distribution system to a first vehicle auxiliary system included in the plurality of vehicle auxiliary systems to drive the first vehicle auxiliary system at a first speed, and directing the electric energy having alternating current directly from the electric power distribution system to a second vehicle auxiliary system included in the plurality of vehicle auxiliary systems to drive the second vehicle auxiliary system at a second speed that is different than the first speed.

In some embodiments, the method may further include increasing a power demand from the motor-generator in response to input indicative of an acceleration pedal of a vehicle not being applied to cause the combustion engine to engine brake. In some embodiments, the method further comprises driving the transmission with the electric power system.

In some embodiments, the combustion engine includes coolant fluid. The plurality of vehicle auxiliary systems includes an electric heater connected with the electric power distribution system. The method further includes powering the electric heater without driving the transmission to heat the coolant fluid.

In some embodiments, the method further includes heating air with the coolant fluid to produce heated air and directing the heated air into a passenger cabin of a vehicle. In some embodiments, the plurality of vehicle auxiliary systems further includes an air compressor, a power steering pump, an air conditioner compressor, a lighting system, air-conditioner air movers, and a starter motor configured to start the combustion engine.

These and other features of the present disclosure will become more apparent from the following description of the illustrative embodiments.

DETAILED DESCRIPTION OF THE DRAWINGS

Figure 1:
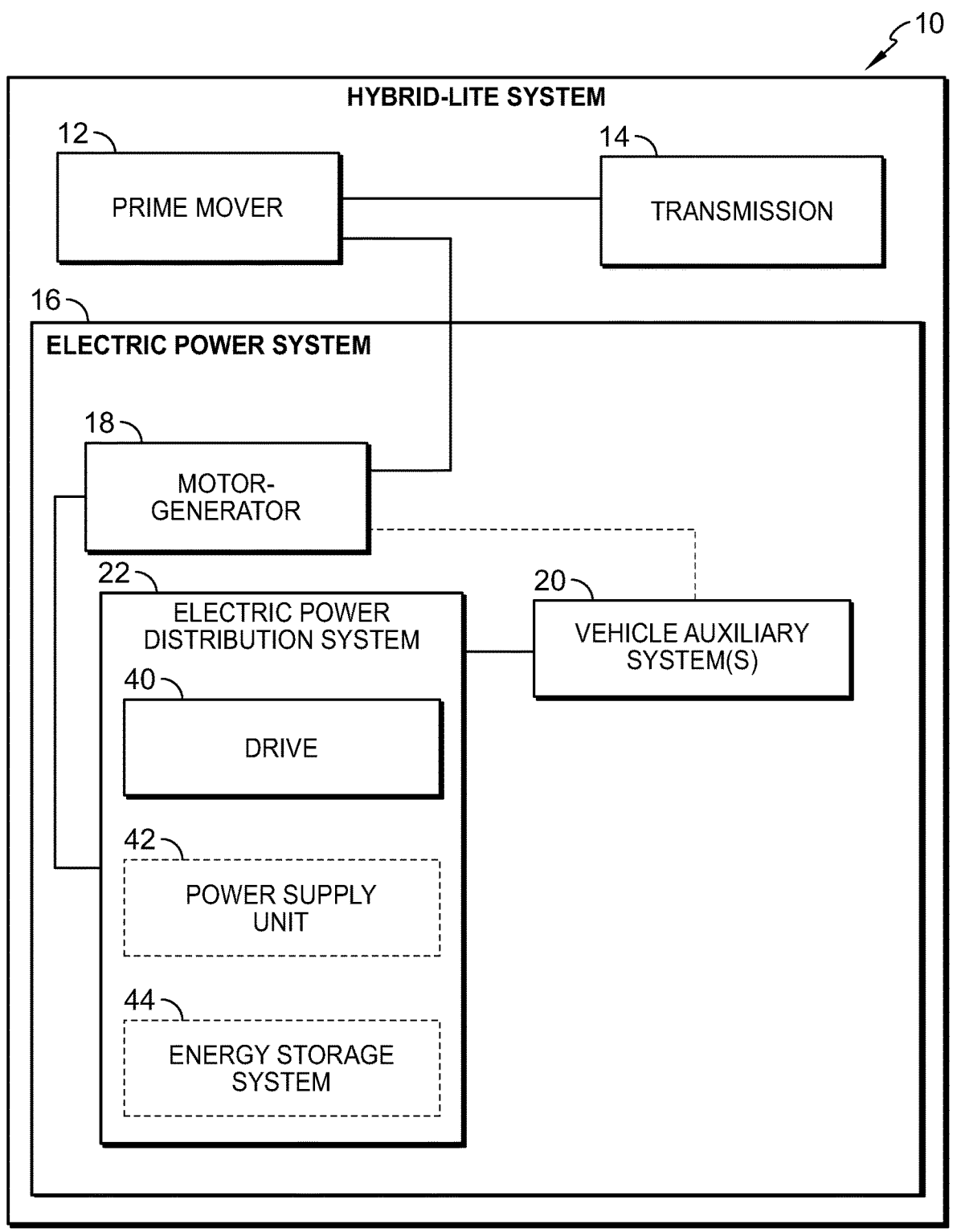
FIG. 1 is a diagrammatic view of a Hybrid-Lite system in accordance with the present disclosure for use with a vehicle and showing that the Hybrid-Lite system includes a prime mover, a transmission, and an electric power system, the electric power system includes a motor-generator configured to provide electric energy, vehicle auxiliary systems configured to be driven by the electric energy, and an electric power distribution system configured to direct the electric energy from the motor-generator to the vehicle auxiliary systems.

For the purposes of promoting an understanding of the principles of the disclosure, reference will now be made to a number of illustrative embodiments illustrated in the drawings and specific language will be used to describe the same.

Some in the mass transit vehicle industry have moved in the recent decades to hybrid drive systems in order to achieve lower fuel consumption and emissions. A traditional hybrid drive system may typically include a conventional prime-mover (usually an internal combustion engine) coupled to an electrified gearbox (transmissions) and a high-voltage, high-capacity battery as a buffer.

Prime-movers on transit vehicles may directly drive auxiliary equipment among which are a power steering pump, an air compressor, a refrigeration compressor (for the air-conditioning unit) and a low voltage alternator (typically 12 or 24 Vdc), for example. Because the prime-mover of a vehicle may operate on a wide range of speeds (typically 700-2500 $min^{-1}$), even on a vehicle with a hybrid drive system, such auxiliaries may need to be sized so that they provide sufficient performance at idling or generally at low engine speeds. Such strategy results in a lower cumulative efficiency of those auxiliaries. Typically, in a transit bus, the overall power handled with those auxiliaries is in the order of 50 kW, which makes the overall efficiency (relative to fuel) of those systems a significant contributor to the overall fuel economy of the vehicle.

Hybrid-Lite Systems 10 in accordance with the present disclosure are shown in FIGS. 1-8. In some embodiments, the systems 10 are configured to electrify a plurality of auxiliaries 20 (that may or may not typically be powered directly from the engine) which may allow the auxiliaries 20 to run at optimum speed and not at a speed proportional to the engine's, and so, to size them properly for optimum efficiency. Transit vehicles with a conventional drive line (conventional manual or automatic gearbox) and properly electrified accessories as provided in the present disclosure may yield fuel consumption values that are identical or close to those of a same vehicle with a hybrid drive line, but at a fraction of the manufacturing cost difference.

The system 10 of the present disclosure responds to that niche of the market. A few example differences between the early hybrid attempts and the system 10 are outlined below. The system 10 combines the electric power generation, conditioning, and distribution to the individual auxiliaries into one system with multiple output channels in order to maximize the efficiency gain of each component. The targeted components may be the A/C unit (A/C compressor), the air compressor, the power steering pump, and a DC-to-DC converter to provide 12 or 24 Vdc to the vehicle's electric system. The electric power generation unit may be driven by the vehicle's engine or a dedicated auxiliary on-board engine.

Figure 3:
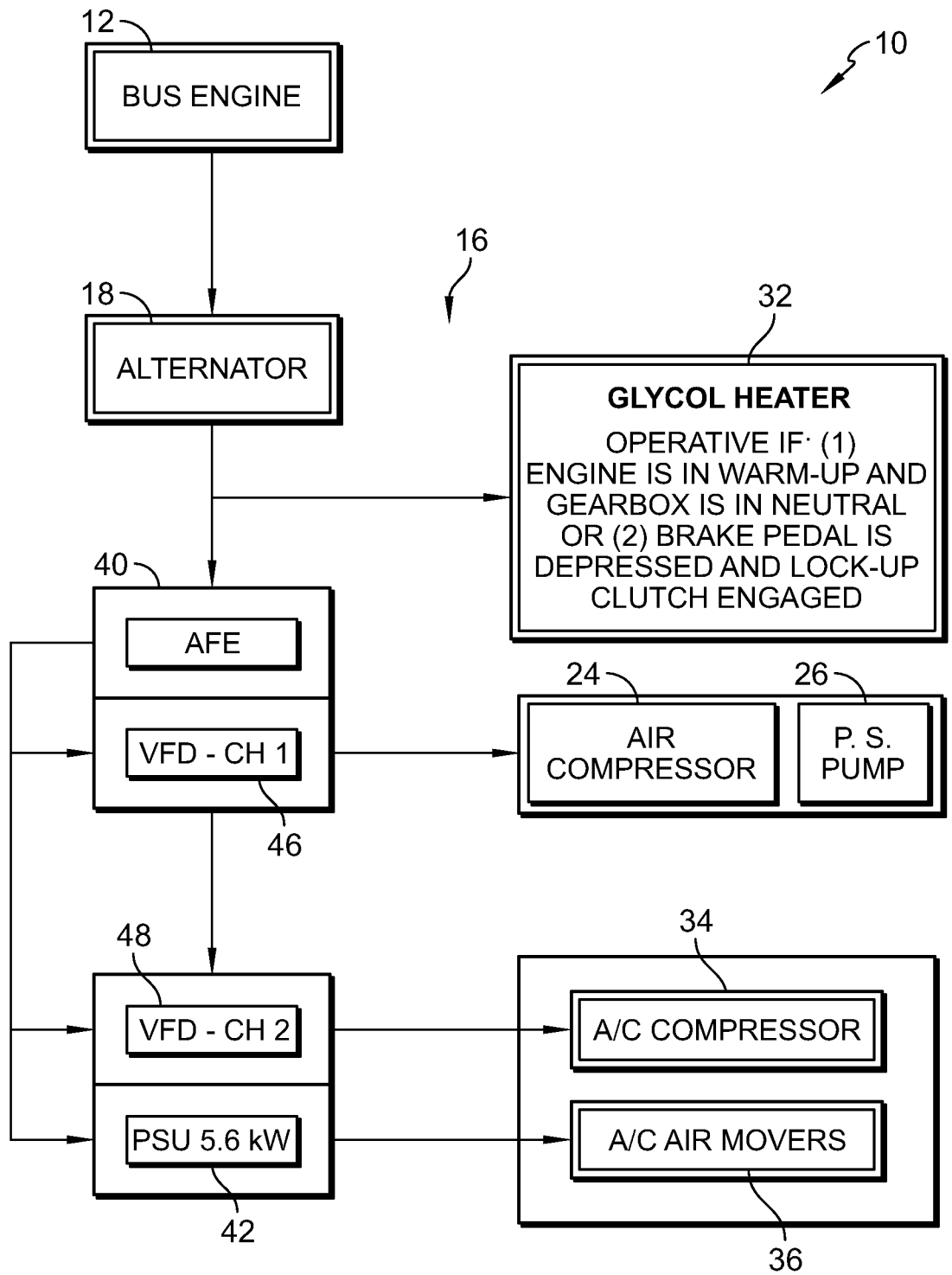
FIG. 3 is a diagrammatic view of another illustrative embodiment of a Hybrid-Lite system.
Figure 4:
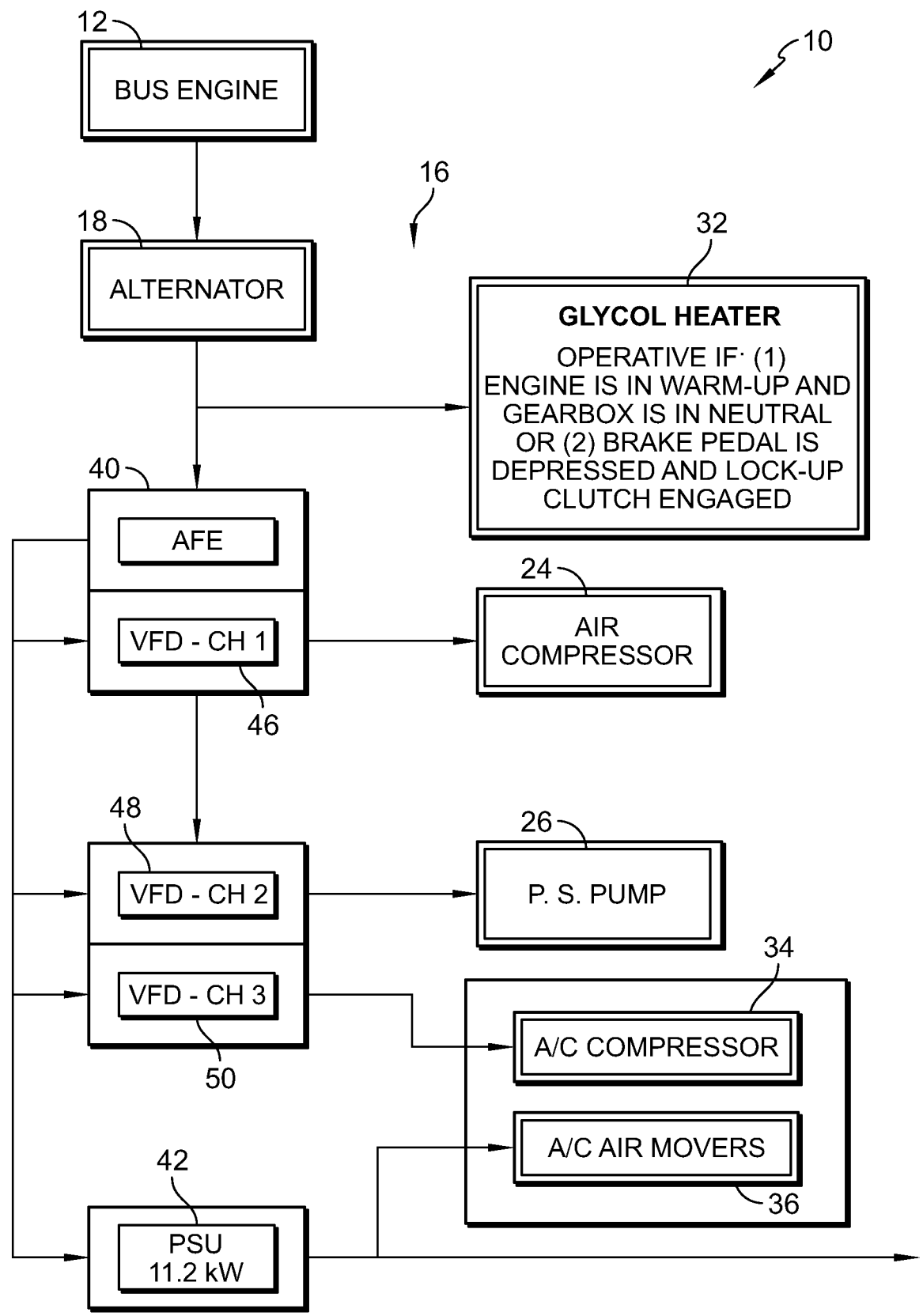
FIG. 4 is a diagrammatic view of yet another illustrative embodiment of a Hybrid-Lite system.

In some embodiments, the system 10 is expanded to further include an electric glycol heater (glycol being the engine's coolant or a coolant loop coupled to that of the engine with a heat exchanger) as shown in FIGS. 3 and 4. The electric heater may be used for at least two independent objectives: (i) Engine warm up: the thermal energy output of the electric heater is put through the engine's coolant and the power generation machine, being driven by the engine puts more load on it, which promotes its fast warm-up, and (ii) Activating the electric heater during braking puts more load on the engine hence increasing its braking effort. During cold weather, such engine braking may also provide energy recovery since it may convert the kinetic energy of the vehicle into useful heat. When the resulting heat is not needed, it may be rejected into the ambient air though the engine's radiator or a heat exchanger. Such an application may reduce wear and fade-out potential on the frictional service brakes.

Figure 7:
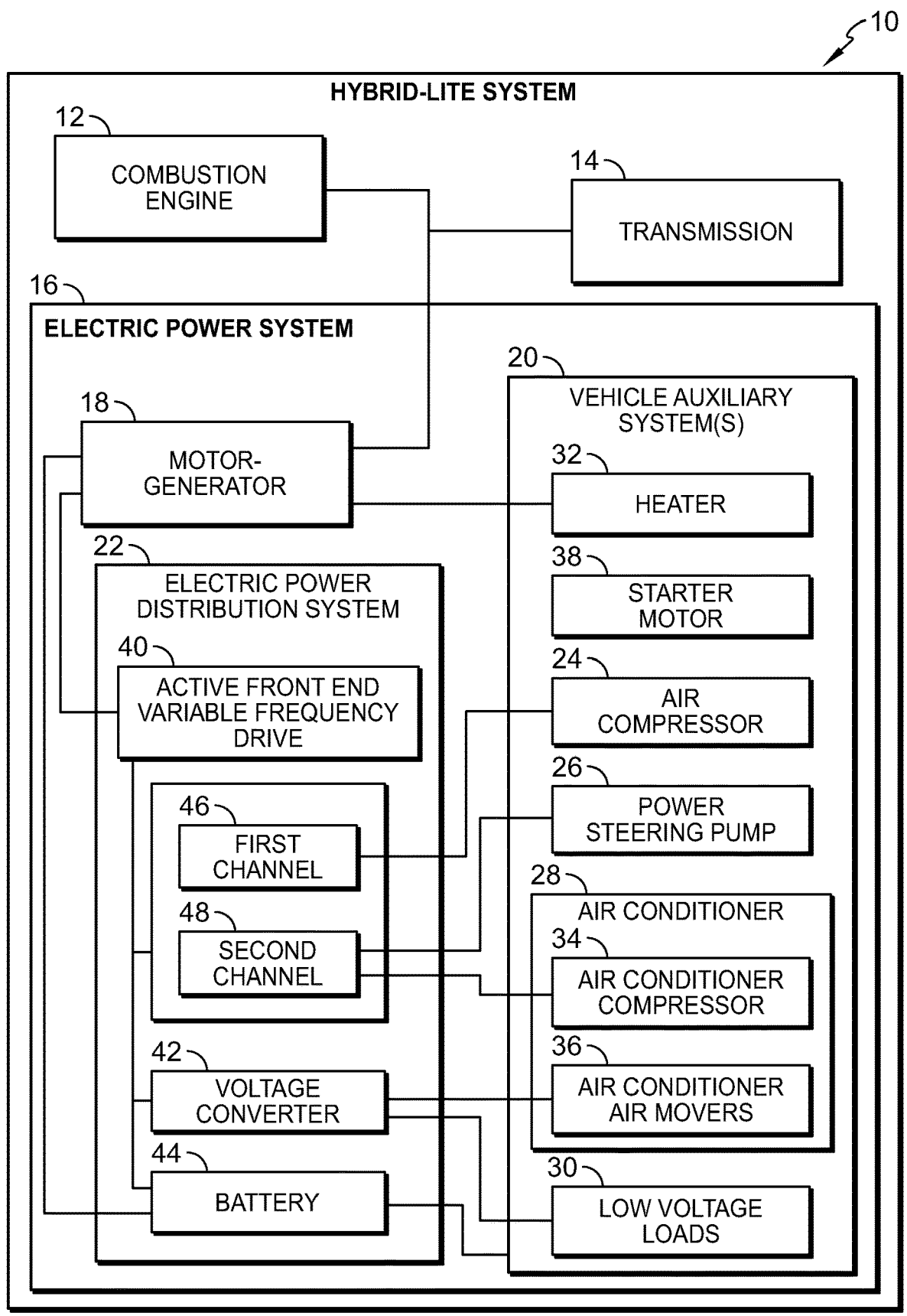
FIG. 7 is a diagrammatic view of an illustrative embodiment of the Hybrid-Lite system of FIG. 6 showing further details of the system.

In some embodiments, the system 10 is further expanded by adding an energy storage device 44 (chemical or capacitive battery) in order to act as a buffer, allow recovery of some kinetic energy during braking into electrical energy, and allow for a start-stop operation of the internal combustion engine as shown in FIG. 7. Such a battery 44 (which is optional) may be orders of magnitude smaller than a battery used in a typical hybrid system, since the battery may not be intended to be the energy source for the vehicle traction for any feasible distance, if any. In some embodiments, the battery 44 is the battery used for starting the vehicle and powering the lighting systems. The battery 44 may be a typical vehicle battery such as a battery configured to deliver about 12.6 volts or less than about 13 volts maximum. The battery 44 may be configured to deliver less than 26 volts maximum.

Figure 5:
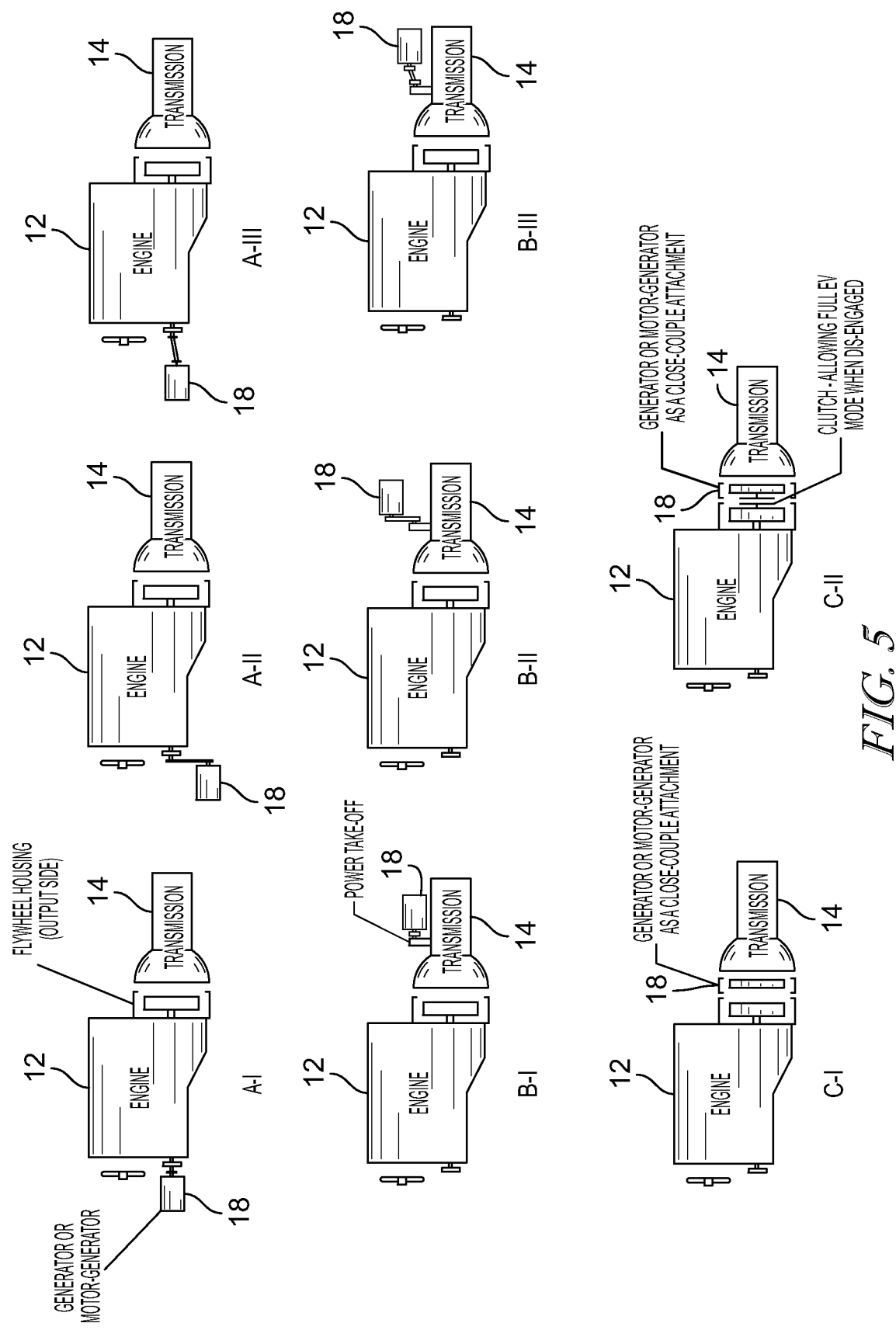
FIG. 5 is a series of views showing exemplarily methods of coupling the electric power system of the Hybrid-Lite system with prime mover and transmission.

In some embodiments, the system 10 is expanded by arranging the electric machine 18 so that it can be used as a motor in which case, along with an electric storage device, it can be used to boost the engine's torque during acceleration as shown in FIGS. 5 and 7. In some embodiments, the system 10 is expanded to arrange the electric machine 18 so that it physically lies between the engine and the gearbox and that it can be disengaged from the engine 12 through a clutch as shown in arrangement C-II of FIG. 5, which may allow that electric machine 18 to move the vehicle in Electric Vehicle-mode. This option may be limited to moving the vehicle a few meters inside a garage due to the capacity of the motor-generator 18 capacity or the battery 44 capacity.

Referring to FIG. 5, illustrative embodiments of lay-out options for the generator or motor-generator 18 coupling with the engine 12 are shown. Lay-outs C-I and C-II show the motor-generator 18 in the form of a coupling attachment between the engine's flywheel and the transmission input, and it may be integrated seamlessly in the conventional drive line. It may also remove any limits on the torque that the crankshaft's front end (accessory pulley side) can handle. In some such embodiments, the transmission is displaced axially about 100 mm.

In some embodiments, for example, lay-outs C-I and C-II shown in FIG. 5, the stator of the motor-generator 18 (which may have windings) includes a standard SAE flywheel housing attachment and may be easily cooled since it is a stationary surface accessible from the outside. The rotor, illustratively with permanent magnets, may be in the form of a coupling between the flywheel and the transmission input and may include a clutch in series as in C-II that, by disengaging the engine 12, may allow operation in EV mode.

An illustrative embodiment of the Hybrid-Lite system 10 for use with a vehicle is shown in FIG. 1. The Hybrid-Lite system 10 is configured to generate and distribute electric energy to be used for powering components of the vehicle. The Hybrid-Lite system 10 is operable with vehicles having a conventional (non-hybrid) prime mover and a conventional (non-hybrid) transmission such as, for example, busses. In some embodiments, the Hybrid-Lite system 10 is operable with electric prime-movers and transmissions. The Hybrid-Lite system 10 may be implemented in vehicles during the vehicle assembly process or may be retro-fit into existing conventional vehicles.

The illustrative Hybrid-Lite system 10 includes the engine 12 (sometimes referred to as a prime mover), the transmission 14, and an electric power system 16 as shown in FIG. 1. Illustratively, the engine 12 comprises an internal combustion engine 12. The transmission 14 is coupled with the combustion engine 12 and configured to be driven by the combustion engine 12 to move the vehicle. The transmission 14 is a conventional mechanical transmission 14 drivable by conventional combustion engines. The electric power system 16 is configured to produce electric energy and to direct the electric energy to components of the Hybrid-Lite system 10 to power those components.

In the illustrative embodiment, the transmission is configured to be driven only by the combustion engine 12. Illustratively, the engine 12 and the electric power system 16 are located outside of the transmission 14. Illustratively, the transmission 14 includes a conventional gearbox configured to be driven by the internal combustion engine 12.

In other embodiments, the transmission 14 is further coupled with the electric power system 16 through a clutch as suggested, for example, in C-I and C-II of FIG. 5. As a result, the transmission 14 may be configured to be driven by one or more of the combustion engine 12 and the electric power system 16. Thus, in some embodiments, the electric power system 16 may power assist the combustion engine 12 in driving the transmission 14 and the electric power system 16 can drive the transmission 14 without assistance from the combustion engine 12 as suggested in FIGS. 5-7.

Figure 2:
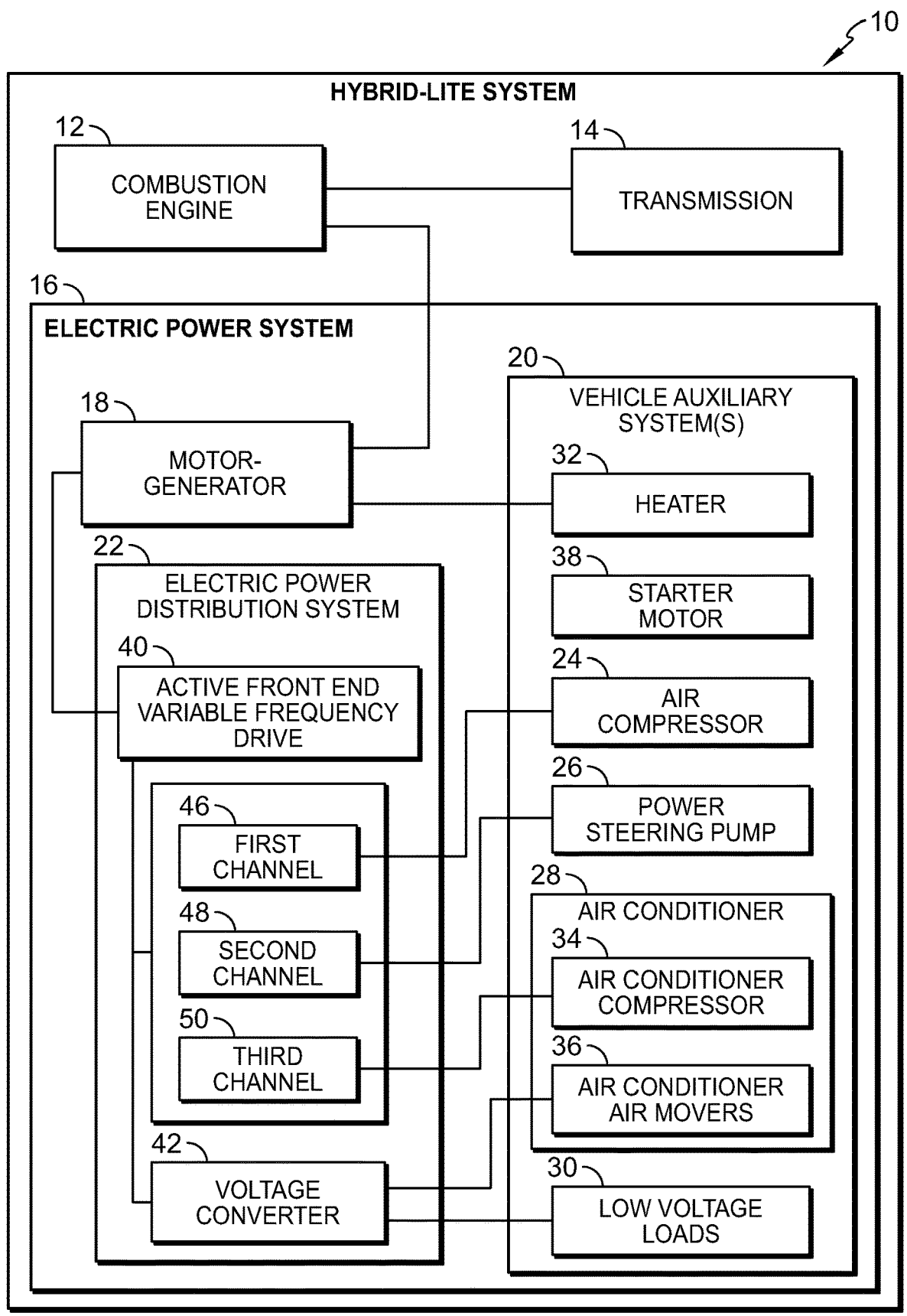
FIG. 2 is a diagrammatic view of an illustrative embodiment of the Hybrid-Lite system of FIG. 1 showing that the electric power system includes an active front end variable frequency drive and a number of channels and each channel is connected with at least one of the vehicle auxiliary systems.

The electric power system 16 includes a motor-generator 18, a plurality of vehicle auxiliary systems 20, and an electric power distribution system 22 as shown in FIGS. 1 and 2. The motor-generator 18 is configured to be driven by the combustion engine 12 to produce the electric energy. The plurality of vehicle auxiliary systems 20 are configured to be powered by the electric energy produced by the motor-generator 18. The electric power distribution system 22 is configured to receive the electric energy from the motor-generator 18, convert the electric energy, and direct the electric energy to one or more of the plurality of vehicle auxiliary systems 20 and/or other components of the Hybrid-Lite system 10 or vehicle.

The motor-generator 18 is configured to be driven by the combustion engine 12 to produce electric energy having an alternating current as suggested in FIG. 2. In the illustrative embodiment, the motor-generator 18 comprises an alternator 18. Illustratively, the motor-generator 18 is operable to provide relatively high voltage as compared to conventional alternators. The motor-generator 18 delivers alternating current energy to the electric power distribution system 22.

In some embodiments, the motor-generator 18 is configured to provide between about 48 volts and about 700 volts. In some embodiments, the motor-generator 18 is configured to provide about 48 volts. In some embodiments, the motor-generator 18 is configured to provide between about 48 volts and about 80 volts. In some embodiments, the motor-generator 18 is configured to provide between about 48 volts and about 650 volts. In some embodiments, the motor-generator 18 is configured to provide between about 48 volts and about 320 volts. In some embodiments, the motor-generator 18 is configured to provide between about 80 volts and about 320 volts. In some embodiments, the motor-generator 18 is configured to provide about 80 volts. In some embodiments, the motor-generator 18 is configured to provide about 320 volts. In some embodiments, the motor-generator 18 is configured to provide greater than about 80 volts. In some embodiments, the motor-generator 18 is configured to provide greater than about 320 volts. In some embodiments, the electric energy provided by the motor-generator 18 is direct current. In some embodiments, the electric energy provided by the motor-generator 18 is alternating current.

In some embodiments, the motor-generator 18 is configured to provide between about 15 and about 50 kilowatts of power. In some embodiments, the motor-generator 18 is configured to provide between about 20 and about 50 kilowatts of power. In some embodiments, the motor-generator 18 is configured to provide between about 30 and about 50 kilowatts of power. In some embodiments, the motor-generator 18 is configured to provide between about 20 and about 30 kilowatts of power. In some embodiments, the motor-generator 18 is configured to provide between about 15 and about 30 kilowatts of power. In some embodiments, the motor-generator 18 is configured to provide about 15 kilowatts of power. In some embodiments, the motor-generator 18 is configured to provide about 50 kilowatts of power.

In some embodiments, the motor-generator 18 includes a plurality of alternators and/or motor-generators. In some embodiments, the motor-generator 18 is driven by an auxiliary prime mover (not shown) included in the Hybrid-Lite system 10 instead of the combustion engine 12. In some embodiments, the motor-generator 18 includes a clutch connected with the transmission 14 to allow the motor-generator 18 to assist the engine 12 in driving the transmission 14 or to drive the transmission 14 without the assistance of the engine 12 as suggested, for example, in C-I and C-II of FIG. 5.

The electric power system 16 may include any number and any combination of vehicle auxiliary systems 20 as suggested in FIGS. 2-4. In the illustrative embodiment, the plurality of vehicle auxiliary systems 20 includes an air compressor 24, a power steering pump 26, an air conditioner 28, low voltage loads 30, and an electric heater 32 as shown in FIGS. 2-4. The illustrative air conditioner 28 includes an air conditioner compressor 34 and air conditioner air movers 36 configured to move the conditioned air through the vehicle. The low voltage loads 30 may include any number of vehicle sub-systems such as, for example, a lighting system for the vehicle. Illustratively, the plurality of vehicle auxiliary systems 20 further includes a starter motor 38 included in the combustion engine 12 and configured to start the combustion engine 12.

Illustratively, the electric power distribution system 22 is connected with the motor-generator 18 and the vehicle auxiliary systems 20 as shown in FIG. 2. The electric power distribution system 22 is adapted to receive the electric energy from the motor-generator 18 and direct the electric energy to the vehicle auxiliary systems 20.

In some embodiments, the engine 12 does not drive any auxiliary vehicle system 20 directly. Instead, the engine 12 powers the electric power system 16 and the electric power system 16 drives directly the auxiliary vehicles systems 20. For example, an engine auxiliary shaft of the engine 12 is coupled only to the motor-generator 18 of the electric power system 16.

In other embodiments, the electric power distribution system 22 is configured to connect with any combination of the motor-generator 18, the combustion engine 12, the transmission 14, and the vehicle auxiliary systems 20. In some embodiments, the electric power distribution system 22 is connected with the motor-generator 18, the combustion engine 12, and the vehicle auxiliary systems 20 without being connected with the transmission 14.

The electric power distribution system 22 includes a drive 40 and optionally a power supply unit 42 and the energy storage system 44 as shown in FIG. 1. The drive 40 is configured to receive the electric energy from the motor-generator 18, convert the electric energy if needed, and direct the electric energy to the other components of the Hybrid-Lite system 10. The power supply unit 42 is connected with the drive 40 and operable to convert and/or direct the electric energy to other components of the Hybrid-Lite system 10. The energy storage system 44 is connected with the drive 40 and configured to receive, store, and discharge the electric energy.

In the illustrative embodiment, the drive 40 comprises an active front end variable frequency drive 40 as shown in FIGS. 2-4. The active front end variable frequency drive 40 is configured to minimize harmonic distortion, vary a voltage of the electric energy, and vary the current received from the motor-generator 18. Illustratively, the active front end variable frequency drive 40 is configured to increase a voltage of the electric energy and rectify the alternating current received from the motor-generator 18 into direct current electric energy. The drive 40 further includes a plurality of channels 46, 48, 50 and each of the plurality of channels 46, 48, 50 is connected with at least one of the corresponding plurality of vehicle auxiliary systems 20.

The power supply unit 42 illustratively comprises a voltage converter 42 as shown in FIGS. 2-4. The voltage converter 42 is connected with the active front end variable frequency drive 40 and configured to vary a voltage, current, and frequency of the electric energy received from the active front end variable frequency drive 40. Illustratively, the voltage converter 42 reduces a voltage of the electric energy. The voltage converter 42 receives alternating current electric energy and outputs direct current electric energy in the illustrative embodiment. In some embodiments, the voltage converter 42 receives direct current electric energy and outputs direct current electric energy. The voltage converter 42 is connected with vehicle auxiliary systems 20 that are configured to be powered by low voltage electric energy such as, for example, the air condition air movers 36 and the lighting system 30 of the vehicle.

The vehicle auxiliary systems 20 are configured to be powered directly from the electric power distribution system 22. Each of the vehicle auxiliary systems 20 is configured to be driven independent of the other vehicle auxiliary systems 20. As such, a first vehicle auxiliary system 20 can be ran at a first speed that is different than a second speed of a second vehicle auxiliary system 20. The first speed and the second speeds being greater than zero rpm.

The Hybrid-Lite system 10 is operable with vehicles having a conventional (non-hybrid) engines and conventional (non-hybrid) transmissions. The system may be installed to an existing conventional vehicle such as a bus. As a result, the system 10 may be considered a Hybrid-Lite system.

Figure 6:
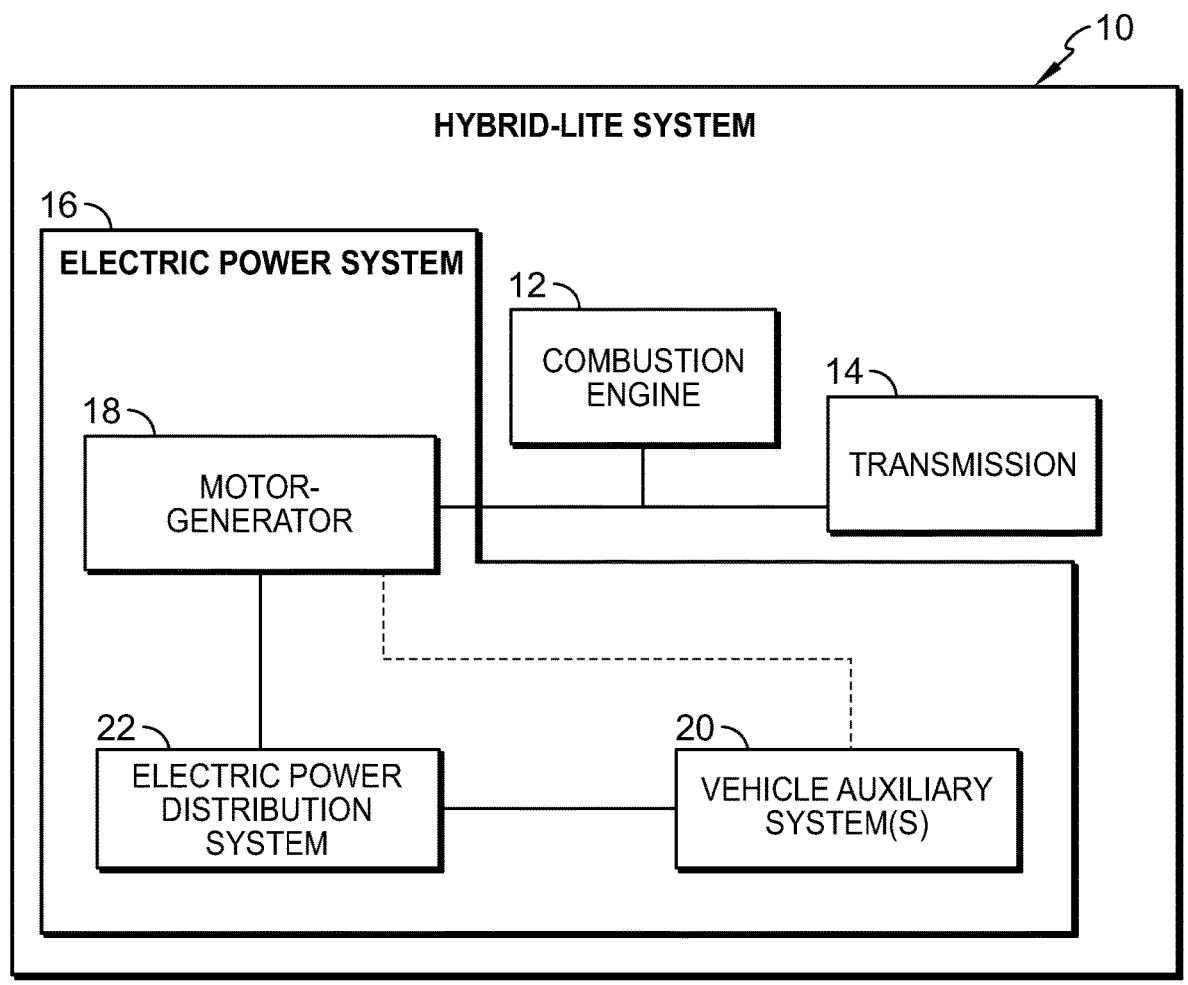
FIG. 6 is a diagrammatic view of another embodiment of the Hybrid-Lite system.

Another embodiment of a Hybrid-Lite system 10 in accordance with the present disclosure is shown in FIG. 4. The Hybrid-Lite system 10 shown in FIG. 4 includes an engine 12, a transmission 14, and an electric power system 16 as shown in FIG. 6. The electric power system 16 includes a motor-generator 18, vehicle auxiliary systems 20, and an electric power distribution system 22. The motor-generator 18 of the hybrid-lite system 10 is connected with the transmission 14. As such, the engine 12 and/or the electric power distribution system 22 are configured to drive the transmission 14.

FIG. 7 shows a detailed view of one embodiment of the Hybrid-Lite system 10 of FIG. 4. Notably, the electric power distribution system 22 included in the Hybrid-Lite system 10 of FIG. 7 includes the energy storage system 44. The energy storage system 44 is configured to receive electric energy from the motor-generator and to selectively power the auxiliaries 20 and/or the transmission 14. The energy storage system 44 may power the transmission directly if the transmission 14 comprises a hybrid transmission or it may power the transmission 14 via the motor-generator 18. The energy storage system 44 may comprise batteries that are capacitive or chemical type.

In some embodiments, the Hybrid-Lite system comprises a combustion engine, an electric power system, and a transmission. The electric power system may include a motor-generator configured to be driven by the combustion engine to produce electric energy and to receive electric energy to produce rotational energy, a plurality of vehicle auxiliary systems adapted to be powered by the electric energy, and an electric power distribution system. The transmission may be coupled with the combustion engine and with the motor-generator and may be configured to be driven by at least one of the combustion engine and the motor-generator during use of the vehicle. The electric power distribution system may be connected with the motor-generator and with the plurality of vehicle auxiliary systems and adapted to receive the electric energy from the motor-generator, to store the electric energy, to direct the electric energy to the at least one of the plurality of vehicle auxiliary systems to power the at least one of the plurality of vehicle auxiliary systems, and to direct the electric energy to the motor-generator to cause the motor-generator to produce rotational energy.

Figure 8:
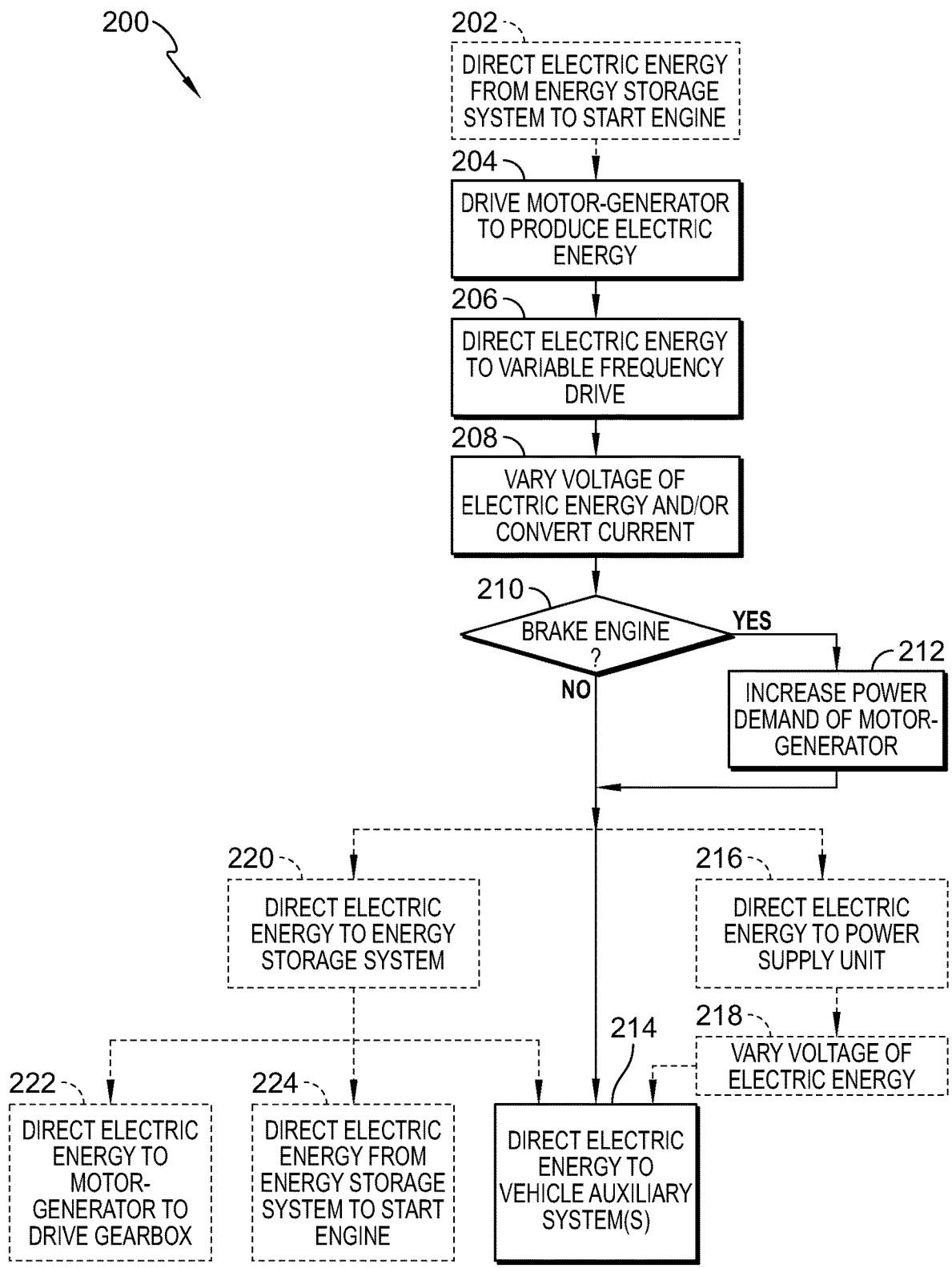
FIG. 8 is a block diagram of an illustrative method of using a Hybrid-Lite system in accordance with the present disclosure.

A method 200 of operating the Hybrid-Lite systems is shown in FIG. 8. The method 200 includes an optionally first step 202 which includes directing electric energy from the energy storage system to start the combustion engine. As such, the Hybrid-Lite system may allow for start/stop operation. In the illustrative embodiment, the electric energy is directed to the starter motor. Alternatively, electric energy may be directed to the motor-generator to drive the transmission to allow for start/stop operation. The method 200 proceeds to step 204 which includes driving the motor-generator to cause the motor-generator to produce electric energy having alternating current. In the illustrative embodiment, the combustion engine is used to drive the motor-generator.

The method 200 proceeds to step 206 which includes directing the electric energy from the motor-generator to the active front end variable frequency drive or other drive. The active front end variable frequency drive varies a voltage of the electric energy and the current in a step 208. Illustratively, the active front end variable frequency drive increases the voltage of the electric energy and rectifies the alternating current to direct current.

Illustratively, the method 200 proceeds to step 210 which includes determining if engine braking is desired as suggested in FIG. 8. Engine braking may be used to generate electric energy and to reduce wear on a braking system of the vehicle. If engine braking is desired, the power demand of the motor-generator is increased to increase resistance on the combustion engine and cause engine braking of the combustion engine in a step 212.

The electric energy produced by the motor-generator and any additional electric energy produced by engine braking may be directed to any one or more of the vehicle auxiliary systems, the power supply unit, and the energy storage system as shown in FIG. 8. In a step 214, the electric energy is directed from the active front end variable frequency drive to one or more of the plurality of vehicle auxiliary systems to drive the one or more of the vehicle auxiliary systems.

In a step 216, the electric energy is directed from the active front end variable frequency drive to the power supply unit as shown in FIG. 8. The power supply unit decreases a voltage of the electric energy in a step 218. The method 200 may proceed to step 214 in which the power supply unit directs the electric energy to one or more of the vehicle auxiliary systems.

If the Hybrid-Lite system 10 includes the energy storage system, the method 200 may proceed to any one or more of steps 220, 222, 224 as shown in FIG. 8. In step 220, the electric energy is directed from the active front end variable frequency drive to the energy storage system. The electric energy is directed from the energy storage system to start the combustion engine in a step 224. The method 200 may also proceed to step 214 in which the energy storage system directs the electric energy to one or more of the vehicle auxiliary systems.

In step 222, the electric energy is directed from the energy storage system to the motor-generator as shown in FIG. 8. As a result, the method 200 may include driving the transmission with at least one of the combustion engine and the electric power system. During step 222, the motor-generator is not driven by the combustion engine and is instead driven by the energy storage system to cause the motor-generator to power assist the combustion engine 12 to drive the transmission or to cause the motor-generator to drive the transmission without the assistance of the combustion engine.

In the illustrative embodiment, the combustion engine 12 includes coolant fluid used to heat and cool the combustion engine 12. The vehicle auxiliary systems 20 includes an immersion heater 32 connected with the active front end variable frequency drive 40 as shown in FIG. 3. The electric immersion heater 32 is configured to be powered by the electric energy to heat the coolant fluid.

During operation, the heater 32 may heat the coolant fluid to a desired temperature while the combustion engine 12 is warming up. As a result, the heated coolant fluid may be used with a heat exchanger to heat air that is directed into a cabin of the vehicle to warm the cabin and passengers of the vehicle. Such a system allows for faster heating of the cabin space as compared to a combustion engine without an electric heater. As a result, the combustion engine 12 may not idle as long before the vehicle is used to transport people and/or goods. As such, step 214 of the method 200 may include powering the electric immersion heater 32 to heat the coolant fluid.

In some embodiments, step 214 of the method 200 may include powering the electric immersion heater without driving the transmission to heat the coolant fluid. The method 200 may further include heating air with the coolant fluid to produce heated air and directing the heated air into a passenger cabin of the vehicle. In some embodiments, the system 10 includes a controller configured to perform the method steps. For example, the controller is configured to control the motor-generator 18 and the heater 32.

The present disclosure provides an electrified drive system 10 for auxiliaries (air conditioner compressor, power steering pump, lighting, etc.) in mass transportation vehicles such as, for example, transit buses, but may extend also to coaches, airport shuttles, etc. One benefit of system 10, for example, is to provide a vehicle with a conventional propulsion system (Diesel, gasoline or NG engine) fitted to a conventional manual or automatic gearbox, mechanically driving the drive axle(s) that would achieve (fully or partially) the low fuel consumption figure a similar vehicle would achieve with a hybrid propulsion system. Such a conventional vehicle fitted with the present Hybrid-Lite system 10 may have a substantially lower manufacturing cost than the hybrid version.

In some embodiments, the Hybrid-Lite system 10 comprises an (or multiple) electric generator driven by the bus engine (or any on-board auxiliary prime-mover). The power generated by such device(s) is fed to the power distribution system that will condition and manage it to the different auxiliary loads on the vehicle, typically, air compressor, power steering system, low-voltage power supply (the typical 24 Vdc), air conditioner compressor(s), engine cooling fan(s) if not driven by the vehicle's 24 Vdc and any other load on the vehicle that requires electric power or that requires mechanical power and can be electrified.

The system 10 may grow in a number of directions. In one illustrative direction, an energy storage device (a battery or a capacitor) is added as a short-term buffer that can also be used as a means for engine starting if possible. In another illustrative direction, a glycol heater (for the bus engine coolant), may be added and operational in specific conditions as discussed above.

In another illustrative direction, the system 10 may be used as an engine brake booster (as well as energy recovery system) during braking, using the glycol heater as load (braking resistor), which may be useful such as, for example, during the heating season or when the engine coolant temperature is sub-optimal)

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A Hybrid-Lite system adapted to be used in a bus, the Hybrid-Lite system comprising
    a combustion engine,
    a transmission coupled with the combustion engine and configured to be driven by the combustion engine, and
    an electric power system that includes a motor-generator configured to be driven by the combustion engine to produce electric energy having alternating current, a plurality of vehicle auxiliary systems, and an electric power distribution system having an active front end variable frequency drive and a plurality of channels,
    wherein the active front end variable frequency drive is connected with the motor-generator, the plurality of channels are connected with the active front end variable frequency drive, and each of the plurality of channels is connected with a corresponding one of the plurality of vehicle auxiliary systems so that the vehicle auxiliary systems are configured to be powered without being driven directly by the combustion engine.

2. The Hybrid-Lite system of claim 1, wherein the plurality of vehicle auxiliary systems include at least an air conditioner compressor, an air compressor, a power steering pump, and a DC-to-DC converter.

3. The Hybrid-Lite system of claim 2, wherein the motor-generator is configured to generate about 15 kilowatts or greater of power.

4. The Hybrid-Lite system of claim 3, wherein the motor-generator and the active front end variable frequency drive are not connected with a battery.

5. The Hybrid-Lite system of claim 4, wherein the motor-generator is configured to drive the transmission.

6. The Hybrid-Lite system of claim 3, wherein the DC-to-DC converter is configured to reduce a voltage of the electric energy received from the active front end variable frequency drive and to direct the electric energy having reduced voltage to at least one of the plurality of vehicle auxiliary systems.

7. The Hybrid-Lite system of claim 6, wherein the plurality of vehicle auxiliary systems further includes air conditioner air movers and a lighting system and the DC-to-DC converter is connected with the air conditioner air movers and the lighting system.

8. The Hybrid-Lite system of claim 7, wherein the transmission is configured to be driven only by the combustion engine.

9. The Hybrid-Lite system of claim 3, wherein the plurality of vehicle auxiliary systems further include an electric heater, a lighting system, air-conditioner air movers, and a starter motor configured to start the combustion engine.

10. The Hybrid-Lite system of claim 1, wherein the electric power distribution system includes a battery connected with the active front end variable frequency drive, the motor-generator, and at least one of the vehicle auxiliary systems.

11. The Hybrid-Lite system of claim 10, wherein the motor-generator is configured to drive the transmission.

12. The Hybrid-Lite system of claim 1, wherein the combustion engine includes a coolant fluid and the plurality of vehicle auxiliary systems further includes an electric heater configured to heat the coolant fluid.

13. The Hybrid-Lite system of claim 12, further comprising a liquid-to-air heat exchanger configured to extract heat from the coolant fluid to condition air moving through the liquid-to-air heat exchanger.

14. The Hybrid-Lite system of claim 13, wherein the electric heater is connected directly with the motor-generator.

15. A method comprising
    providing a combustion engine, a transmission coupled with the combustion engine and configured to be driven by the combustion engine, and an electric power system including a motor-generator, a plurality of vehicle auxiliary systems, and an electric power distribution system connected with the motor-generator and the plurality of vehicle auxiliary systems,
    driving the motor-generator with the combustion engine to cause the motor-generator to produce electric energy having alternating current,
    directing the electric energy having alternating current from the motor-generator to the electric power distribution system,
    directing the electric energy having alternating current directly from the electric power distribution system to a first vehicle auxiliary system included in the plurality of vehicle auxiliary systems to drive the first vehicle auxiliary system at a first speed, and
    directing the electric energy having alternating current directly from the electric power distribution system to a second vehicle auxiliary system included in the plurality of vehicle auxiliary systems to drive the second vehicle auxiliary system at a second speed that is different than the first speed.

16. The method of claim 15, further comprising increasing a power demand from the motor-generator in response to input indicative of an acceleration pedal of a vehicle not being applied to cause the combustion engine to engine brake.

17. The method of claim 16, wherein the combustion engine includes coolant fluid, the plurality of vehicle auxiliary systems includes an electric heater connected with the electric power distribution system, and the method further comprises powering the electric heater without driving the transmission to heat the coolant fluid.

18. The method of claim 17, further comprising heating air with the coolant fluid to produce heated air and directing the heated air into a passenger cabin of a vehicle.

19. The method of claim 18, wherein the method further comprises driving the transmission with the electric power system.

20. The method of claim 19, wherein the plurality of vehicle auxiliary systems further includes an air compressor, a power steering pump, an air conditioner compressor, a lighting system, air-conditioner air movers, and a starter motor configured to start the combustion engine.

* * * * *